United States Patent Office 3,408,336
Patented Oct. 29, 1968

3,408,336
HEAT STABILIZED POLYBENZIMIDAZOLES
Royal H. Benson, Texas City, Tex., assignor to Monsanto Company, St. Louis, Mo., a corporation of Delaware
No Drawing. Filed Aug. 12, 1965, Ser. No. 479,339
17 Claims. (Cl. 260—78.4)

ABSTRACT OF THE DISCLOSURE

Novel polybenzimidazoles having improved heat stability prepared by reacting linear polybenzimidazole condensation polymers with a monocarboxylic acid ester at temperatures from 100° to 500° C.

---

The present invention relates to novel polybenzimidazoles condensation polymers. More particularly, the present invention relates to new and novel polybenzimidazoles having improved heat stability, and to a method for their preparation.

Polybenzimidazoles are a well known and very useful group of linear condensation polymers which have found wide application in the plastics industry. These polymers are known for their toughness, wear resistance, resiliency and thermal stability. Generally, these polymers are prepared by reacting substantially equal quantities of a tetraamine, i.e., orthodiamino diphenyl, and a dicarboxylic acid or a derivative thereof, particularly the diesters of dicarboxylic acids. Such polybenzimidazoles usually have the following general formula

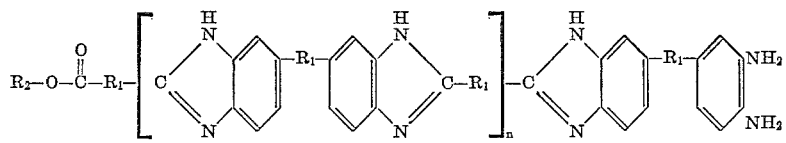

wherein $R_1$ is a carbon-to-carbon bond or divalent hydrocarbon radical, $R_2$ is hydrogen or a hydrocarbon radical and $n$ is an integer.

While these polybenzimidazole polymers are relatively stable at high temperatures, it has been found that for many applications this stability is inadequate. For example, polybenzimidazoles have been found to be excellent substrates for chromatographic analysis. However, in such chromatographic techniques as those suggested and claimed in copending application, Ser. No. 479,109, filed Aug. 12, 1965, these polymers have been found inadequate in many instances in their resistance to heat. This co-pending application claims as an embodiment thereof a method for analyzing mixtures containing compounds having labile hydrogen atoms comprising first treating a polybenzimidazole such as that described above with tritium to exchange the labile hydrogen atoms of the polybenzimidazole for tritium to porvide a tritium containing polybenzimidazole substrate. A mixture containing compounds having labile hydrogen atoms is then contacted with the tritium containing polybenzimidazole, thus causing the tritium in the substrate to be exchanged for the labile hydrogen atoms of the compound containing such. The tritium containing compound is then passed into a radioactivity detection means which detects and measures the amount of tritium which is directly referable to the compound of the mixture which originally contained the labile hydrogen atoms. In this utility it has been found that at the high temperatures often necessary for the analysis of high boiling compounds, decomposition of the polybenzimidazoles occurs. Decomposition in this utility is evidenced by a release of tritium from the polybenzimidazole substrate as a result of heat.

It is an object of the present invention to provide new and novel polybenzimidazole compositions. Another object of the present invention is to provide polybenzimidazole compositions of improved heat stability. Still another object of the present invention is to provide a method for improving the heat stability of polybenzimidazoles. Additional objects will become apparent from the following description of the invention herein disclosed.

In fulfillment of these and other objects it has been found that polybenzimidazoles of improved heat stability are obtained by heating at elevated temperatures and in the absence of oxygen, substantially equimolar quantities of a tetraamine selected from the group consisting of (1) 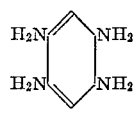

(2) 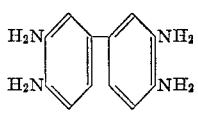

and, (3) those having the formula

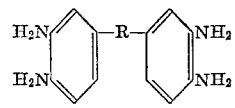

wherein R is a divalent hydrocarbon radical, and a compound selected from the group consisting of dicarboxylic acids and esters of dicarboxylic acids, recovering a linear condensation polymer, reacting said linear condensation polymer with an ester of a monocarboxylic acid at a temperature of 100° C. to 550° C., the quantity of said ester of a monocarboxylic acid being such as to cause a weight ratio of said ester of a monocarboxylic acid to said linear condensation polymer of 1:10 to 1:1.

The resulting polybenzimidazoles have been found to have substantially improved heat stability over conventional polybenzimidazoles. As a result, the polybenzimidazoles of the present invention are advantageous as coating materials for very high temperature applications and are particularly useful as substrates in high temperature chromatographic techniques.

In order to further describe as well as to illustrate the present invention, the following examples are presented. These examples are in no manner to be construed as limiting the present invention.

EXAMPLE I

A polybenzimidazole was prepared in a conventional manner by charging approximately 214 parts by weight of 3,3'diamino benzidene and 242 parts by weight of diphenyl oxalate to an autoclave. This mixture was flushed with nitrogen and heated at 220° C. for a period of 1 hour. A polybenzimidazole polymeric condensation product was obtained from the autoclave, which was ground to a powder and reheated under nitrogen while the temperature was increased to 400° C. over a period of 2 hours. The temperature was then rapidly increased to 500° C. and maintained for 72 hours.

EXAMPLE II

A second polybenzimidazole polymer was prepared in accordance with the present invention by charging approximately 214 parts by weight of 3,3′diamino benzidene and 242 parts by weight of diphenyl oxalate to an autoclave, flushing the mixture with nitrogen and then heating the mixture at 220° C. for one hour. The resulting product was ground to a powder and approximately 308 parts by weight of said product was charged to an autoclave with about 200 parts by weight of phenyl benzoate. This mixture was heated slowly to 400° C. over a period of 4 hours. It was then heated rapidly to 500° C. and held at this temperature for 72 hours. A new polybenzimidazole condensation product was thereby obtained.

EXAMPLE III

To demonstrate improved heat stability characteristics of the polybenzimidazole polymers prepared in accordance with the present invention, a comparison was made between the polybenzimidazoles of Examples I and II above. A portion of each of the polybenzimidazole polymers was ground to approximately 200 mesh size and placed in a stainless steel chromatographic column of approximately .125 inch internal diameter and 9 inches in length which was connected in an oven to a source of dry inert gas. Tritiated water was then passed through each of the columns at a temperature of 150° C. until all of the activated or labile hydrogen atoms of the polybenzimidazole were replaced with tritium. Each of the columns was connected to a means for detecting the radioactivity of any effluent from the chromatographic column. The radioactivity of the effluent from each of the columns was continuously observed. It was found that at a temperature of approximately 150° C., the polybenzimidazole substrate prepared in Example I gave up tritium at the rate of 40 disintegrations per second per minute, which indicated thermal decomposition. However, the polybenzimidazole substrated prepared in Example II in accordance with the present invention gave up tritium at a rate of only 10 disintegrations per second per minute at the same temperature.

The above comparison of the conventional polybenzimidazole of Example I with that of Example II prepared in accordance with the present invention clearly demonstrates the improved heat stability of the polybenzimidazole prepared in accordance with the present invention. The increased heat stability obtained with the polybenzimidazole of the present invention represents approximately 300% improvement.

The tetraamines used in preparing the compositions of the present invention are

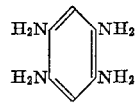

or those having the formula

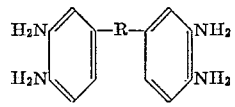

wherein R is a carbon-to carbon bond or a divalent hydrocarbon radical. These tetraamines include such compounds as 3, 3′diamino benzidene, 1, 2, 4, 5-tetraamino benzene, 1, 2-bis(3, 4-diamino phenyl)ethane, 2, 2-bis(3, 4-diamino phenyl) propane and the like. The preferred tetraamines used in preparing the compositions of the present invention are the diamino diphenyl compounds having not more than 3 carbon atoms between the phenyl groups. If the chain length between the phenyl groups is increased beyond 3 carbon atoms there is a significant decrease in the melting point and stiffness of the resulting polybenzimidazole.

The dicarboxylic acids used in the preparation of the polybenzimidazole compositions of the present invention are those having the general formula

HOOC—R—COOH wherein R is a divalent hydrocarbon radical, preferably an aryl or alkyl hydrocarbon radical. A particularly useful group of dicarboxylic acids are those wherein R is an alkyl radical of 2 carbon atoms. Another particularly useful group of dicarboxylic acids are those wherein R is a divalent benzene or biphenyl radical. Nonlimiting examples of such compounds are sebacic acid, adipic acid, oxalic acid, phthalic acid, isophthalic acid and 4, 4′diphenyl dicarboxylic acid and the like. The esters of dicarboxylic acids useful in preparing the compositions of the present invention generally are the phenyl, methyl or ethyl esters of the above-described acids, either half esters or full esters. Half esters are those wherein only one of the carboxylic groups of the dicarboxylic acid has been esterified, while full esters are those on which both carboxylic groups have been esterified. Preferably, diesters or full esters of the dicarboxylic acids are used when esters of dicarboxylic acids are used in preparing the compositions of the present invention. Nonlimiting examples of such preferred diesters are diphenyl isophthalate and diphenyl oxalate.

Reaction of the tetraamine with the dicarboxylic acid or ester derivative thereof is carried out in the absence of oxygen and most often at elevated temperatures. Usually these elevated temperatures are within the range of approximately 125 to 550° C. The polymerization reaction is very rapid and is generally complete in a short period of time. Seldom will the reaction time for reacting the tetraamine and the dicarboxylic acid or ester thereof be greater than 72 hours. Most often, however, reaction periods of ½ to 4 hours are sufficient for purposes of the present invention.

The linear condensation polymer produced by reaction of a tetraamine with a dicarboxylic acid or ester thereof is recovered by any means known to the art for recovering such materials. This polymeric material is then reacted with the ester of a monocarboxylic acid also at elevated temperatures and in the absence of oxygen. The elevated temperatures for this reaction also are most often within the range of 125 to 550° C. The amount of the ester of monocarboxylic acid used is such to cause a weight ratio of this ester to the linear condensation polymer of from about 1:10 to 1:1. More often, however, the amount of this ester is such that the weight ratio of ester to linear condensation polymer is 1:1 to 1:8.

The monocarboxylic acid esters useful in preparing the heat stable polybenzimidazole compositions of the present invention include the esters of both the alkyl and aryl monocarboxylic acids. Several nonlimiting examples of such esters include phenyl benzoate, naphthyl benzoate, toluyl benzoate, xylyl benzoate, methyl benzoate, ethyl benzoate, propyl benzoate, butyl benzoate, phenyl benzoate, hexyl benzoate, heptyl benzoate, octyl benzoate, nonyl benzoate, decyl benzoate and the like. Most often, esters of the alkyl or aryl monocarboxylic acids used in preparing the compositions of the present invention are those having no greater than 10 carbon atoms in the alkyl or aryl radical. Preferably, the aryl benzoates are used as the ester of a monocarboxylic acid with phenyl benzoate being the preferred aryl benzoate.

The properties of the polybenzimidazole prepared in accordance with the present invention are unusual as compared to the conventional polybenzimidazole condensation polymers. The polybenzimidazoles prepared in accordance with the present invention are generally high softening polymers which are essentially noncrystalline. These polymers are useful in the preparation of molded objects which must resist relatively high temperatures. Further, these polymers find excellent utility in the coating of metal or other surfaces which are subjected to relatively high temperatures. The polybenzimidazoles prepared in accordance with the present invention are also useful in electrical applications where rigidity at elevated temperatures and a high softening point are required. As indicated herein-above, the polybenzimidazoles prepared in accordance with the present invention are particularly useful as substrates in high temperatures chromatographic applications.

What is claimed is:

1. A process for the preparation of polybenzimidazoles which comprise heating at elevated temperatures and in the absence of oxygen, substantially equimolar quantities of a tetraamine selected from the groups consisting of (1)

(2)

and, (3) those having the formula

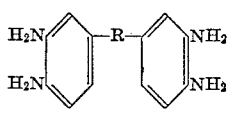

wherein R is a divalent hydrocarbon radical having no greater than 3 methylene groups, and a compound selected from the group consisting of dicarboxylic acids and esters of dicarboxylic acids, recovering a linear condensation polymer, reacting said linear condensation polymer with an ester of a monocarboxylic acid at a temperature of 125 to 550° C., the quantity of said ester of a monocarboxylic being such as to cause a weight ratio of said ester of a monocarboxylic acid to said linear condensation polymer of 1:1 to 1:10.

2. The process of claim 1 wherein the tetraamine is

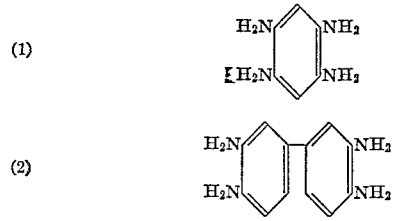

3. The process of claim 1 wherein the tetraamine is

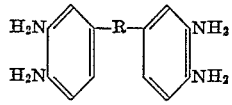

4. The process of claim 1 wherein the tetraamine is one having the formula

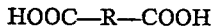

wherein R is a divalent hydrocarbon radical having no greater than 3 methylene groups.

5. The process of claim 1 wherein the elevated temperatures are 125 to 550° C.

6. The process of claim 1 wherein the compound with which the tetraamine is heated is a dicarboxylic acid having the formula

HOOC—R—COOH wherein R is a hydrocarbon radical selected from the group consisting of alkyl and aryl radicals.

7. The process of claim 6 wherein R is an alkyl radical of 2 to 8 carbon atoms.

8. The process of claim 6 wherein R is a benzene radical.

9. The process of claim 6 wherein R is a biphenyl radical.

10. The process of claim 1 wherein the ester of a monocarboxylic acid is an ester of an acid selected from the group consisting of alkyl carboxylic acids and aryl carboxylic acids.

11. The process of claim 1 wherein the ester of a monocarboxylic acid is an alkyl benzoate of no greater than 10 carbon atoms in the alkyl radical.

12. The process of claim 1 wherein the ester of a monocarboxylic acid is an aryl benzoate of no greater than 10 carbon atoms in the aryl radical.

13. The process of claim 12 wherein the ester of a monocarboxylic acid is phenyl benzoate.

14. The process of claim 1 wherein the amount of ester of a monocarboxylic acid is such as to provide a weight ratio of said ester to said linear condensation polymer of 1:1 to 1:8.

15. A polybenzimidazole composition of improved heat stability comprising the reaction product of (a) a linear condensation polymer obtained by reacting substantially equimolar quantities of a tetraamine selected from the group consisting of (1)

(2)

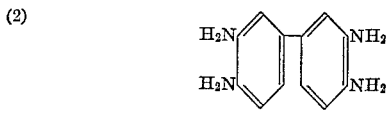

and (3) those having the formula

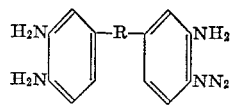

wherein R is a divalent hydrocarbon radical having no greater than 3 methylene groups with a compound selected from the group consisting of dicarboxylic acids and esters of dicarboxylic acids, and (b) an ester of a monocarboxylic acid.

16. The composition of claim 15 wherein said ester of a monocarboxylic acid is an aryl benzoate of no greater than 10 carbon atoms in the aryl radical.

17. The composition of claim 15 wherein said tetraamine is 3,3'-diaminobenzidene, the ester of a dicarboxylic acid is diphenyloxalate and said ester of a monocarboxylic acid is phenyl benzoate.

References Cited

UNITED STATES PATENTS 3,174,947   3/1965   Marvel et al. _____ 260—47

JOSEPH L. SCHOFER, *Primary Examiner.*

C. A. HENDERSON, JR., *Assistant Examiner.*